United States Patent [19]
Schmitt et al.

[11] Patent Number: 5,109,223
[45] Date of Patent: Apr. 28, 1992

[54] APPARATUS FOR INDUCTIVE SIGNAL TRANSFER IN SENSING HEADS

[75] Inventors: Walter Schmitt, Traunreut; Franz Ritz, Ubersee, both of Fed. Rep. of Germany

[73] Assignee: Dr. Johannes Heidenhain GmbH, Traunreut, Fed. Rep. of Germany

[21] Appl. No.: 343,929

[22] Filed: Apr. 26, 1989

[30] Foreign Application Priority Data

Apr. 26, 1988 [DE] Fed. Rep. of Germany ....... 3813949

[51] Int. Cl.⁵ .............................. G08C 19/12
[52] U.S. Cl. ................... 340/870.31; 33/561; 307/119; 324/149; 324/158 P
[58] Field of Search ................. 340/870.31; 33/559-561; 307/119; 324/149, 158 P

[56] References Cited

U.S. PATENT DOCUMENTS

| 3,268,880 | 8/1966 | Miller ................. 340/870.31 X |
| 4,145,816 | 3/1979 | Stobbe et al. .................. 33/174 |
| 4,536,661 | 8/1985 | McMurtry ..................... 307/119 |

FOREIGN PATENT DOCUMENTS 0108521  5/1984  European Pat. Off. .
0254903  2/1988  European Pat. Off. .
2341251  2/1975  Fed. Rep. of Germany .
3229992  2/1986  Fed. Rep. of Germany .

Primary Examiner—Ulysses Weldon
Attorney, Agent, or Firm—Willian Brinks Olds Hofer Gilson & Lione

[57] ABSTRACT

An apparatus is provided for inductive transfer of the scanning signal from a sensing head to a machine body. The apparatus includes cooperating inductive coupling elements between a receiving lug of the sensing head and the spindle of the machine. Cooperating coupling elements for inductive coupling are also provided between the spindle and the machine body. The coupling element of the receiving lug includes a coil with a ferromagnetic core. The spindle includes a second cooperating coil lying opposite to the receiving-lug coil which also includes a ferromagnetic core. The scanning signal is conducted from the detector to the coil in the receiving lug and is transferred inductively to the spindle. The scanning signal then passes over a transfer coil to a receiving coil. The transfer coil and receiving coil are configured such that the signal is transferred independently of rotation of the spindle relative to the machine body.

43 Claims, 4 Drawing Sheets

APPARATUS FOR INDUCTIVE SIGNAL TRANSFER IN SENSING HEADS

BACKGROUND OF THE INVENTION

The present invention relates generally to an apparatus for inductive signal transfer between the sensing head of a measuring or processing machine and the machine body, and more particularly, to an apparatus for inductive signal transfer between the sensing head of a measuring or processing machine and the machine body wherein the signal is transferred independently of relative motion between the spindle of the machine and the machine body.

A number of measuring and switching sensing heads for measuring machines and machine tools are known in the art. In both measuring machines and machine tools, it is necessary to transfer the signal from the sensing head to an evaluating unit disposed outside of the sensing head.

German Patent Specification DE-OS 23 41 251, for example, discloses a machine tool which uses inductive signal transfer wherein the measuring sensing head is installed in a spindle of the machine. The deflection of the sensing probe of the sensing head is transduced into a proportional electric signal. This electric signal is modulated on a carrier wave and then fed to a transfer coil. The transfer coil is received on the sensing head by means of a ring which includes a groove. The transfer coil cooperates with a receiving coil which is fastened in a groove formed in a projection formed in the spindle casing. The modulated carrier signals after being transferred to the receiving coil are transferred an evaluating unit for further processing.

The ring for receiving the transfer coil is constructed such that it projects-beyond the spindle. This construction has the disadvantage that the ring increases the structural size of the sensing head and therefore makes handling of the sensing head difficult. The transfer coil which is disposed on the ring must cooperate over a relatively narrow air gap with the receiving coil which is disposed on the spindle casing. A constant air gap is difficult to maintain, since the coil carrier is constructed as a ring on the outside of the sensing head. Maintaining this constant air gap is particularly difficult, since the ring and the transfer coil are exposed directly to environmental conditions. Further, since the receiver coil is disposed on the sensing head, if the sensing head is used in a rough environment, interruptions of the transfer interval can easily occur. Further, use of the sensing head in a rough environment may even lead to destruction of the coils.

Therefore, in view of the above, it is an object of the present invention to provide an apparatus with which accurate and trouble-free inductive signal transfer is possible between the sensing head and an arrangement disposed outside of the sensing head.

It is a further object of the present invention to provide an apparatus for inductive signal transfer which may be compactly constructed.

It is still a further object of the present invention to provide an apparatus for inductive signal transfer wherein the coils for the inductive signal transfer are protected against environmental influences during the measuring operation, thereby assuring dependable measuring operation.

SUMMARY OF THE INVENTION

To achieve the foregoing objects and in accordance with other purposes of the invention, an apparatus is provided for inductive signal transfer between the sensing head of a spindle of a measuring or processing machine and the body of the machine, wherein the spindle is rotatably mounted about its axis. The sensing head is mounted on the spindle by means of a receiving lug. The sensing head includes a detector which generates an electric signal according to the scanning of an object being measured. Cooperating inductive coup-ling elements are provided between the receiving lug and the spindle. The apparatus further includes angle independent coupling means for inductive coupling between the spindle and the machine body independent of the rotary angle between the spindle and the machine body. The angle independent coupling means assures that the inductive coupling is maintained even upon relative rotation between the spindle and the machine body.

Other advantages of the invention lie in the fact that the coils for the inductive signal transfer are protected against environmental influences thereby assuring dependable measuring operation. Further, with the arrangement of the present invention it is possible to provide a more compact arrangement than is possible with available inductive signal transfer devices.

Additional objects, advantages and novel features of the invention will be set forth in part in the description which follows, and in part will become apparent to those skilled in the art upon examination of the following or may be learned by practice of the invention. The objects and advantages of the invention may be obtained by means of the combinations particularly pointed out in the appended claims.

DETAILED DESCRIPTION OF THE PRESENTLY PREFERRED EMBODIMENTS

Figure 1:
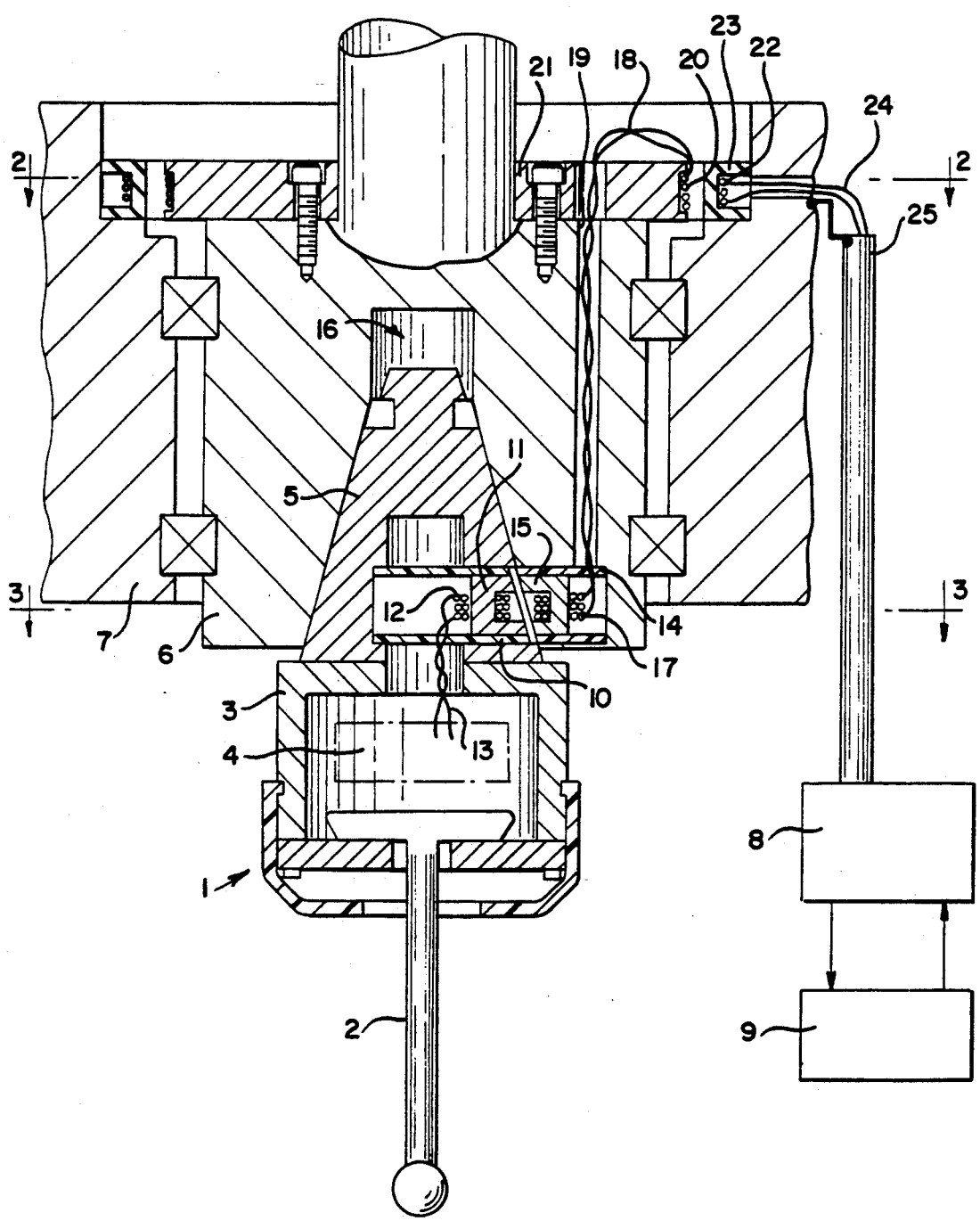
FIG. 1 is an axial sectional view of a preferred embodiment of the present invention wherein the angle independent signal transfer coupling is installed in a machine tool spindle.
Figure 2:
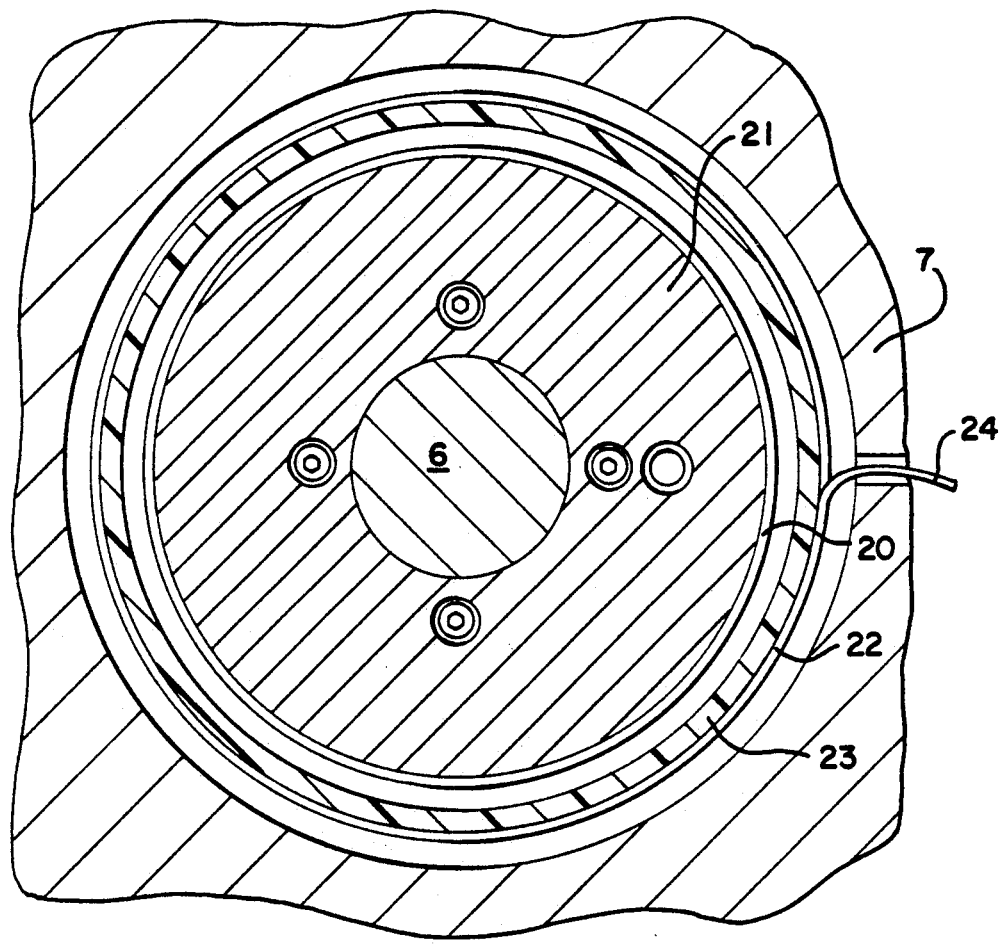
FIG. 2 is a sectional view through Lines II—II in FIG. 1.
Figure 3:
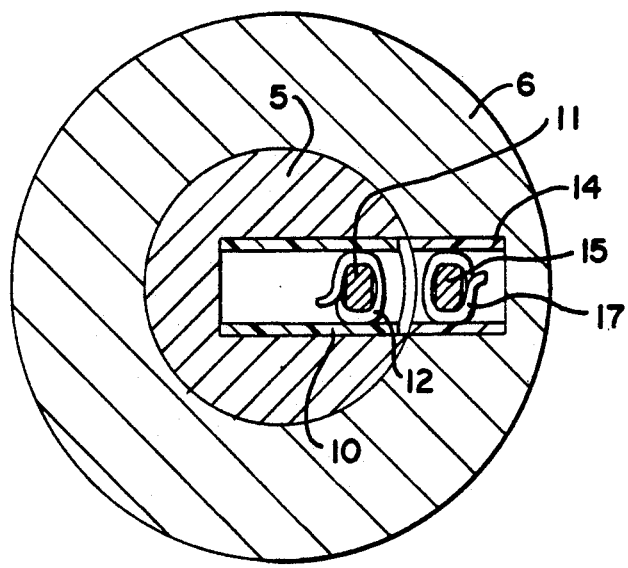
FIG. 3 is a sectional view through Lines III—III of FIG. 1.

Referring now to the drawings and, particularly, to FIGS. 1-3, a first embodiment for inductive signal transfer according to the present invention is illustrated. In this exemplary embodiment, the sensing head 1 comprises a switching sensing head, wherein the deflection of the feeler pin 2 is detected relative to the casing 3 by a detector 4.

The detector 4 may be a light barrier arrangement such as the one shown in German Patent No. 32 29 992, a capacitive detector, or a detector in the form of contact switches such as those illustrated in EP-A2 0 254 903. It will be clearly apparent to those skilled in the art that the use of other detectors wherein an alteration of an electrical signal is generated in response to linear movement or a swinging movement of the feeler pin 2 is also possible.

In the switching-type sensing head 1 shown, a change in the signal caused by a deflection of the feeler pin 2 is preferably triggered at a prescribed signal level such that the detector 4 delivers a scanning impulse in the form of a square impulse.

The machine tool includes a spindle 6 which is rotatably mounted in the machine body 7. The receiving lug 5 of the sensing head 1 is fastened in the spindle 6 of the machine tool. The sensing head 1 is preferably mounted in a detachable manner such that it can be installed and changed in the spindle 6 like a tool.

The machine tool includes an evaluating unit 8 which prepares the scanning signal for processing in a numerical control unit 9. The scanning signal is transferred from the detector 4 to the spindle 6 and from there to the evaluating unit 8, which is preferably fastened to the machine body 7. The numerical control unit 9 controls the relative movement between the workpiece and the sensing head 1 during the scanning of a workpiece. The numerical control unit 9 may also prescribe the installing and changing of the sensing head 1.

The scanning signal is transferred from the detector 4 to the spindle 6, in an inductive manner, that is, the scanning signal is inductively coupled between the detector 4 and the spindle 6. For this inductive coupling arrangement, a coupling element is integrated on the receiving lug 5 and a cooperating coupling element is integrated on the spindle 6.

The coupling element for the receiving lug 5 preferably includes a coil which may be disposed in an aperture of the receiving lug 5 or around a surface of the receiving lug 5. As used herein the term "about the receiving lug 5" means disposed in an aperture of the receiving lug 5 or around a surface of the receiving lug 5. In the embodiment illustrated in FIGS. 1-3, the receiving lug coupling element includes a bushing 10 with a ferromagnetic core 11 on which a coil 12 is wound. The ends of the coil 12 are connected with the detector 4 by means of electric line 13.

The spindle coupling element comprises a coil 17 which cooperates with the receiving lug coil 12. The coil for the spindle 6 may be disposed in an aperture of the spindle 6 or around a surface of the spindle 6. As used herein the term "about the spindle 6" means disposed in an aperture of the spindle 6 or around a surface of the spindle 6. In the illustrated embodiment of FIGS. 1-3, a bushing 14 with a ferromagnetic core 15 is integrated in the spindle 6. The coil 17 is wound around the ferromagnetic core 15.

The two ferromagnetic cores 11 and 15 are preferably constructed in U-shaped form and disposed such that the shanks of the cores 11 and 15 are arranged opposite one another with a small air gap maintained between them. The air gap for the transfer of the scanning signal lies in a receiving opening of the spindle 6 and is thus protected against external influences. Similarly, in this arrangement, the coils 12 and 17 as well as the cores 11 and 15 are protected against damage.

Preferably means (not shown) are provided on the receiving lug 5 to align the sensing head 1 to the spindle 6. This preferred arrangement assures that during measuring operations, the two cores 11 and 15 will remain in a position opposite to one another.

It will be readily apparent to those skilled in the art that the coils 12 and 17 do not necessarily have to be provided with cores 11 and 15 made of a ferromagnetic material. The ferromagnetic cores are preferable however to assure good inductive coupling. For reasons apparent to those skilled in the art, the bushings 10 and 14 are preferably made of a material with poor magnetic conductance, such as brass.

Angle independent inductive coupling means is provided for inductively coupling the scanning signal received from the inductive coupling arrangement of the receiving lug 5 and spindle 6 to the a coupling element of the machine body 7. The angle independent inductive coupling means comprises a transfer coil 20 and a receiving coil 22. An electric line 18 is connected at one end to the leads of the coil 17 and at the other end to the leads of a transfer coil 20. In the illustrated embodiment the line 18 is disposed in an opening 19 of the spindle 6.

A annular plate 21, which is preferably screwed to the spindle 6, serves as the carrier of the transfer coil 20. The windings of the transfer coil 20 extend around the entire circumference of the plate 21 (i.e., over a 360 degree angle of rotation) to define an annular or ring-shaped transfer coil 20.

The receiving coil 22, also in ring-shaped form in the illustrated embodiment, is wound on a carrier 23 which is disposed opposite to the transfer coil 20. The carrier 23 is securely fixed to the machine body 7 by suitable means. With this arrangement, the scanning signal is transferred inductively from the transfer coil 20 to the receiving coil 22 in a manner independent of the angular position between the spindle 6 and the machine body 7. A transfer of the signal is therefore possible even during rotation of the spindle 6.

The receiver coil 22, which is fixed relative to the machine body 7, is connected to the evaluating unit 8 by means of an electric line 24 connected to the leads of the receiver coil 22. The electric line 24 includes an outer shield 25 which is connected in an electrically conducting manner with the machine body 7. The numerical control unit 9 cooperates with the evaluating unit 8 in a manner known in the art. The evaluating unit 8 may also be a component of the numerical control unit 9.

In the embodiment described above, the transfer coil 20 is wound on the circumference of the plate 21. As will be apparent to those skilled in the art, other configurations are possible. For example, the transfer coil 20 may be disposed on the free upper surface of the plate 21. In this configuration, the receiver coil 23 must also be disposed directly opposite to the transfer coil 20.

Figure 4:
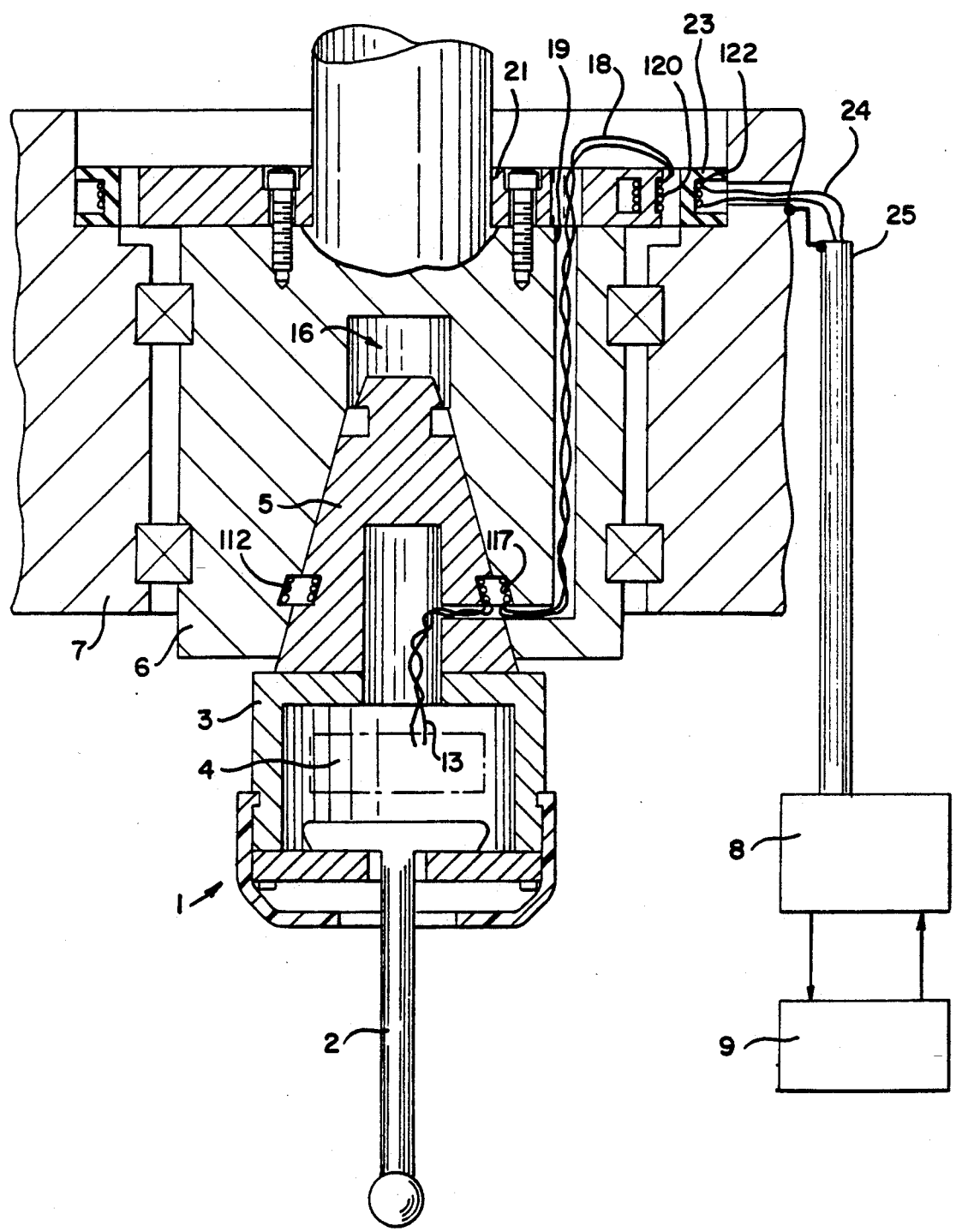
FIG. 4 shows an axial sectional view of a second preferred embodiment of the present invention for inductive signal transfer.

FIG. 4 illustrates a second preferred embodiment of the present invention wherein the inductive signal transfer from the receiving lug 5 to the spindle 6 occurs independent of the relative angular position between the receiving lug 5 and the spindle 6. For purposes of illustration, similar parts are labeled with the same reference numbers in all of the figures.

In this second preferred embodiment, a coil 112 is also provided as an annular winding on the circumference of the receiving lug 5 to define a ring-shaped coil. The corresponding coil 117 is disposed in the spindle 6 and is similarly constructed as an annularly wound coil 117.

In this embodiment the transfer coil 120 and the receiver coil 122 are arranged such that the signal transfer between the spindle 6 and the machine body 7 also occurs independently of the relative angle between these components. To achieve this independent signal transfer, the receiver coil 122 may be wound over the entire circumference of the carrier 23 , the transfer coil 120 however may be constructed to occupy only a small section of the circumference.

In another preferred embodiment, the coils of the sensing head 1 and the corresponding coil of the spindle 6 are arranged such that inductive signal transfer is independent of the angle between the sensing head 1 and the spindle 6. In this embodiment, at least one of the cooperating coils of the sensing head 1 and the spindle 5 is wound over the entire circumference. That is, a first one of these two coil is wound around the entire circumference while the other oppositely lying coil may be constructed such that it functions only over a small section of the circumference of the first coil.

In summary, according to the invention, the following devices for the inductive signal transfer are provided:

(a) An apparatus with signal transfer dependent or independent of the relative angle between the sensing head and the spindle, with the apparatus being disposed inside of a receiving opening in the spindle. For the transfer dependent case, each of the two cooperating coils occupies only a section of the circumference. For the case of signal transfer independent of angle, at least one of the two cooperating coils must be wound around the entire circumference.

(b) An apparatus for signal transfer independent of the relative angle between the spindle and the machine body. In this apparatus, at least one of the coils must be wound over the entire circumference, that is, over an angle of 360°.

The apparatus according to the embodiments illustrated in FIGS. 1-3 has proven particularly advantageous. A very high efficiency is achieved through the signal transfer between the sensing head 1 and the spindle 6, with the aid of the ferromagnetic cores 11 and 15 (ferrite transmitters). A high signal transfer efficiency or transfer factor between spindle 6 and the machine body 7 may also be achieved by constructing the ring transformer such that the transfer coil 20 and a receiver coil 22 include large surfaces lying opposite to one another around the entire circumference.

Figure 5:
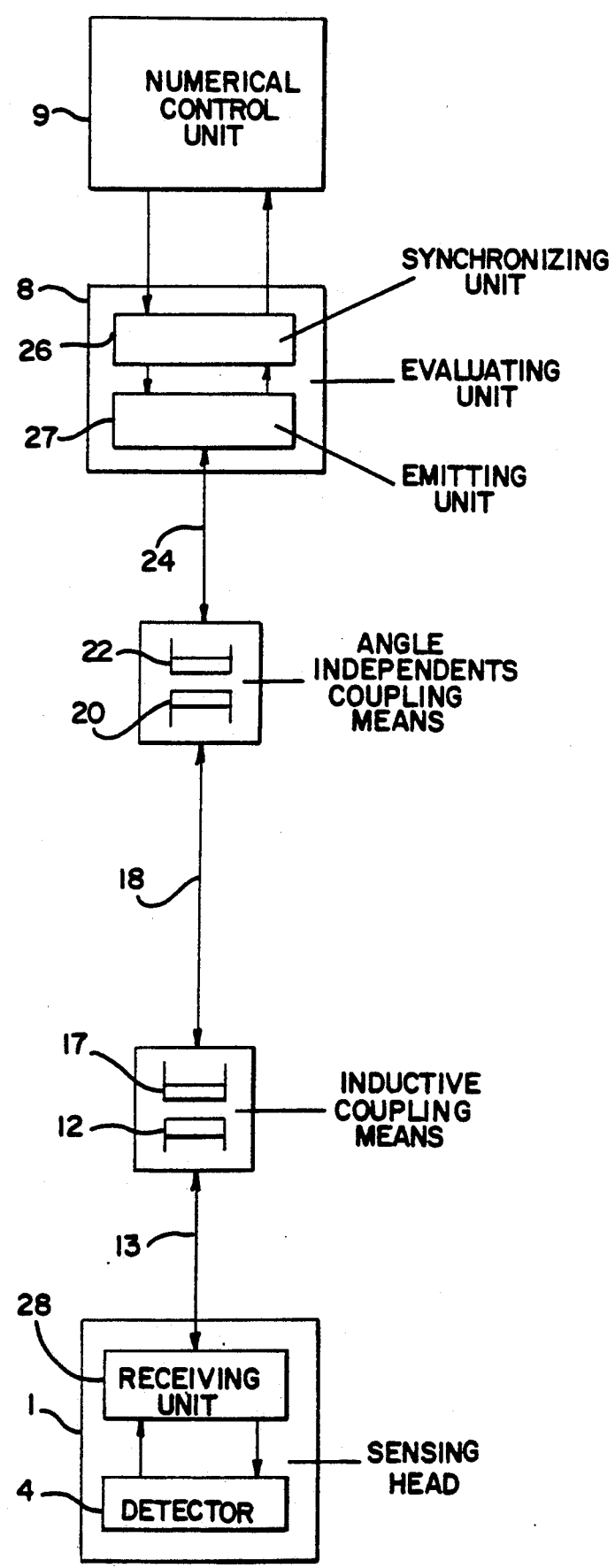
FIG. 5 is a preferred embodiment of the signal transfer functions, in block circuit diagram form.

It may be seen from the block circuit diagram of the inductive signal transfer illustrated in FIG. 5 that the embodiments disclosed above are suited not only for the transfer of the scanning signal from the scanning head 1 to the numerical control 9, but also for signal transfer in the other direction. For example, an activation signal can be fed from the numerical control unit 9 over the evaluating unit 8, the receiver coil 22, the transfer coil 20, the coil 17 and the coil 12 to the sensing head 1. This activation signal, for example, may bring the sensing head into the so-called readiness position, i.e. such that the detector 4 can detect deflections of the feeler pin 2.

In addition to the scanning signal, a signal indicating the state of the battery as well as a readiness signal can be transferred from the sensing head 1 to the numerical control unit 9. In every position of the spindle, the changeable sensing head 1 permits both activation of the sensing head 1 and the control unit 9 to receive signals emitted from the sensing head 1.

The electronic system in the sensing head 1 and in the evaluating unit 8 is preferably constructed according to the embodiment disclosed in FIG. 5 such that a signal transfer over an interval is possible in both directions. In this exemplary embodiment, a synchronizing stage 26 is provided to control the emitting and receiving units 27 and 28, respectively, such that the signal transfer occurs in either one or the other direction.

The device for signal transfer has been described above with respect to the sensing head of a machine tool. However, as will be recognized by those skilled in the art, the invention may also be used in sensing heads of measuring machines.

The foregoing description of the preferred embodiments of the present invention has been presented for purposes of illustration and description. The disclosed embodiments are not intended to be exhaustive or to limit the invention to the precise forms disclosed, and obviously many modifications and variations are possible in light of the above teachings. The embodiments were chosen and described in order to best explain the principles of the invention and its practical applications. It is intended that the scope of the invention be defined by the following claims, including all equivalents.

We claim:

1. In a measuring or processing machine including a machine body, a sensing head mounted in a spindle, the spindle being rotatably mounted in the machine body such that the sensing head is rotatably mounted about its axis, and means comprising a receiving lug disposed in a receiving opening of the spindle for detachably mounting the sensing head from the spindle, the sensing head including a detector which generates an electric signal in response to scanning of an object being measured, an apparatus for inductive signal transfer between the sensing head and the machine body, the improvement comprising:

inductive coupling means for inductively transferring a signal between the receiving lug and the spindle, the inductive coupling means including a receiving lug coupling element disposed in the receiving lug and a first spindle coupling element disposed in the spindle; and angle independent inductive coupling means for inductively transferring a signal between the spindle and the machine body independent of the angle of rotation between the spindle and the machine body, the angle independent inductive coupling means include a second spindle coupling element disposed in the spindle and a machine body coupling element disposed in the machine body.

2. The apparatus according to claim 1 wherein:

the receiving lug coupling element comprises a coil disposed about the receiving lug; and the first spindle coupling element comprises a coil disposed about the spindle opposite to the receiving-lug coil;

the detector being connected to the receiving-lug coil such that the electric signal of the detector is conducted to the receiving-lug coil, the receiving-lug coil and the first-spindle coil being disposed to cooperate at least over a part of the circumference of the receiving lug.

3. The apparatus according to claim 2 further including a first ferromagnetic core disposed in an aperture in the receiving lug and a second ferromagnetic core disposed in an-aperture in the spindle, the first and second cores including shanks and being disposed such that the shanks are disposed opposite to one another with a small gap therebetween, wherein the receiving-lug coil is wound about the first ferromagnetic core and the first-spindle coil is wound about the second ferromagnetic core.

4. The apparatus according to claim 2 wherein:

the receiving lug includes a groove around its circumference, the receiving-lug coil being wound around the receiving lug in the receiving-lug groove; and the spindle includes a groove around its circumference, the first-spindle coil being wound around the spindle in the spindle groove.

5. The apparatus according to claim 2 wherein at least one of the receiving-lug and first-spindle coils is wound circumferentially to define a ring-shaped coil and the other of the coils is configured to operate only on a partial zone of the circumference of the ring-shaped coil.

6. The apparatus according to claim 2 wherein:
the second spindle coupling element comprises a transfer coil mounted about the surface of the spindle facing the machine body;
the machine body coupling element comprises a receiving coil mounted about the machine body; and
a connector for conducting a signal induced in the first spindle coil to the transfer coil;
the transfer and receiving coils configured such that inductive coupling therebetween is independent of angle of rotation between the spindle and the machine body.

7. The apparatus according to claim 3 wherein:
the second spindle coupling element comprises a transfer coil mounted about the surface of the spindle facing the machine body;
the machine body coupling element comprises a receiving coil mounted about the machine body; and
a connector for conducting a signal induced in the first spindle coil to the transfer coil;
the transfer and receiving coils configured such that inductive coupling therebetween is independent of angle of rotation between the spindle and the machine body.

8. The apparatus according to claim 4 wherein:
the second spindle coupling element comprises a transfer coil mounted about the surface of the spindle facing the machine body;
the machine body coupling element comprises a receiving coil mounted about the machine body; and
a connector for conducting a signal induced in the first spindle coil to the transfer coil;
the transfer and receiving coils configured such that inductive coupling therebetween is independent of angle of rotation between the spindle and the machine body.

9. The apparatus according to claim 5 wherein:
the second spindle coupling element comprises a transfer coil mounted about the surface of the spindle facing the machine body;
the machine body coupling element comprises a receiving coil mounted about the machine body; and
a connector for conducting a signal induced in the first spindle coil to the transfer coil;
the transfer and receiving coils configured such that inductive coupling therebetween is independent of angle of rotation between the spindle and the machine body.

10. The apparatus according to claim 6 wherein the transfer coil and the receiving coils comprise coils wound in an annular form such that they can cooperate to inductively transfer a signal over their entire circumference.

11. The apparatus according to claim 7 wherein the transfer coil and the receiving coils comprise coils wound in an annular form such that they can cooperate to inductively transfer a signal over their entire circumference.

12. The apparatus according to claim 8 wherein the transfer coil and the receiving coils comprise coils wound in an annular form such that they can cooperate to inductively transfer a signal over their entire circumference.

13. The apparatus according to claim 9 wherein the transfer coil and the receiving coils comprise coils wound in an annular form such that they can cooperate to inductively transfer a signal over their entire circumference.

14. The apparatus according to claim 6 wherein at least one of the transfer coil and the receiving coil comprises a coil wound in annular form.

15. The apparatus according to claim 7 wherein at least one of the transfer coil and the receiving coil comprises a coil wound in annular form.

16. The apparatus according to claim 8 wherein at least one of the transfer coil and the receiving coil comprises a coil wound in annular form.

17. The apparatus according to claim 9 wherein at least one of the transfer coil and the receiving coil comprises a coil wound in annular form.

18. The apparatus according to claims 6 wherein a signal induced in the receiving coil is fed over an electric line to an evaluating unit.

19. The apparatus according to claims 7 wherein a signal induced in the receiving coil is fed over an electric line to an evaluating unit.

20. The apparatus according to claims 8 wherein a signal induced in the receiving coil is fed over an electric line to an evaluating unit.

21. The apparatus according to claims 9 wherein a signal induced in the receiving coil is fed over an electric line to an evaluating unit.

22. The apparatus according to claims 10 wherein a signal induced in the receiving coil is fed over an electric line to an evaluating unit.

23. The apparatus according to claims 11 wherein a signal induced in the receiving coil is fed over an electric line to an evaluating unit.

24. The apparatus according to claims 12 wherein a signal induced in the receiving coil is fed over an electric line to an evaluating unit.

25. The apparatus according to claims 13 wherein a signal induced in the receiving coil is fed over an electric line to an evaluating unit.

26. The apparatus according to claims 14 wherein a signal induced in the receiving coil is fed over an electric line to an evaluating unit.

27. The apparatus according to claims 15 wherein a signal induced in the receiving coil is fed over an electric line to an evaluating unit.

28. The apparatus according to claims 16 wherein a signal induced in the receiving coil is fed over an electric line to an evaluating unit.

29. The apparatus according to claims 17 wherein a signal induced in the receiving coil is fed over an electric line to an evaluating unit.

30. The apparatus according to claim 18 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

31. The apparatus according to claim 19 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

32. The apparatus according to claim 20 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

33. The apparatus according to claim 21 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

34. The apparatus according to claim 22 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

35. The apparatus according to claim 23 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

36. The apparatus according to claim 24 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

37. The apparatus according to claim 25 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

38. The apparatus according to claim 26 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

39. The apparatus according to claim 27 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

40. The apparatus according to claim 28 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

41. The apparatus according to claim 29 wherein each of the evaluating unit and the sensing head include a transmitting and receiving unit operatively connected such that the cooperating inductive coupling elements of the sensing head and spindle transfer a signal in both directions and such that the cooperating inductive coupling elements of the spindle and machine body transfer a signal in both directions.

42. In measuring or processing machine including a machine body, in a spindle rotatably mounted in the machine body, and a receiving lug disposed in a receiving opening of the spindle, a sensing head mounted in the receiving lug such that the sensing head is rotatably mounted about its axis, the sensing head including a detector which generates an electric signal in response to scanning of an object being measured, an apparatus for inductive signal transfer between the sensing head and the machine body, the improvement comprising:

inductive coupling means for inductively transferring a signal between the receiving lug and the spindle, the inductive coupling means including a receiving lug coupling element disposed in the receiving lug and a first spindle coupling element disposed in the spindle; and angle independent inductive coupling means for inductively transferring a signal between the spindle and the machine body independent of the angle of rotation between the spindle and the machine body, the angle independent inductive coupling means including a second spindle coupling element disposed in the spindle and a machine body coupling element disposed in the machine body.

43. The apparatus of claim 42 wherein the sensing head is detachably mounted in the receiving lug.

* * * * *

UNITED STATES PATENT AND TRADEMARK OFFICE
CERTIFICATE OF CORRECTION

PATENT NO. : 5,109,223
DATED : April 28, 1992
INVENTOR(S) : Walter Schmitt et al.

It is certified that error appears in the above-identified patent and that said Letters Patent is hereby corrected as shown below:

Column 1, line 34, after "transferred" insert --to--.

Column 1, line 37, delete "projects-beyond" and substitute therefor --projects beyond--.

Column 2, line 12, delete "coup-ling" and substitute therefor --coupling--.

Column 4, line 9, before "coupling" delete "a".

Column 4, line 16, delete "A" and substitute therefor --An--.

Column 5, line 10, delete "coil" and substitute therefor --coils--.

Column 6, line 41, delete "include" and substitute therefor --including--.

Column 6, line 59, delete "an-aperture" and substitute therefor --an aperture--.

Column 7, line 1, delete "receiving lug" and substitute therefor --receiving-lug--.

Column 8, line 25, delete "claims" and substitute therefor --claim--.

UNITED STATES PATENT AND TRADEMARK OFFICE
CERTIFICATE OF CORRECTION

PATENT NO. : 5,109,223

DATED : April 28, 1992

INVENTOR(S) : Walter Schmitt et al.

It is certified that error appears in the above-identified patent and that said Letters Patent is hereby corrected as shown below:

Column 8, line 28, delete "claims" and substitute therefor --claim--.

Column 8, line 31, delete "claims" and substitute therefor --claim--.

Column 8, line 34, delete "claims" and substitute therefor --claim--.

Column 8, line 37, delete "claims" and substitute therefor --claim--.

Column 8, line 40, delete "claims" and substitute therefor --claim--.

Column 8, line 43, delete "claims" and substitute therefor --claim--.

Column 8, line 46, delete "claims" and substitute therefor --claim--.

Column 8, line 49, delete "claims" and substitute therefor --claim--.

Column 8, line 52, delete "claims" and substitute therefor --claim--.

Column 8, line 55, delete "claims" and substitute therefor --claim--.

Column 8, line 58, delete "claims" and substitute therefor --claim--.

UNITED STATES PATENT AND TRADEMARK OFFICE
CERTIFICATE OF CORRECTION

PATENT NO. : 5,109,223

DATED : April 28, 1992

INVENTOR(S) : Walter Schmitt et al.

It is certified that error appears in the above-identified patent and that said Letters Patent is hereby corrected as shown below:

Column 10, line 31, after "In" insert --a--.

Column 10, line 32, after "body," delete "in".

Signed and Sealed this

Twenty-ninth Day of March, 1994

Attest:

BRUCE LEHMAN

Attesting Officer     Commissioner of Patents and Trademarks